(12) United States Patent
Wookey

(10) Patent No.: US 7,899,898 B2
(45) Date of Patent: Mar. 1, 2011

(54) SCALING SYSTEMS MANAGEMENT USING A STATELESS PROXY

(75) Inventor: Michael J. Wookey, Los Gatos, CA (US)

(73) Assignee: Oracle America, Inc., Redwood City, CA (US)

( * ) Notice: Subject to any disclaimer, the term of this patent is extended or adjusted under 35 U.S.C. 154(b) by 241 days.

(21) Appl. No.: 12/165,227

(22) Filed: Jun. 30, 2008

(65) Prior Publication Data

US 2009/0327470 A1    Dec. 31, 2009

(51) Int. Cl.
*G06F 15/173* (2006.01)
(52) U.S. Cl. .................. 709/223; 709/224; 707/741
(58) Field of Classification Search ........... 709/223, 709/224; 707/741
See application file for complete search history.

(56) References Cited

U.S. PATENT DOCUMENTS

| 6,389,464 | B1 | 5/2002 | Krishnamurthy et al. |
| 6,978,314 | B2 | 12/2005 | Tarr |
| 2002/0004815 | A1 | 1/2002 | Muhlestein et al. |
| 2007/0088814 | A1 | 4/2007 | Torii |
| 2007/0192385 | A1* | 8/2007 | Prahlad et al. ............ 707/202 |

* cited by examiner

*Primary Examiner*—John Follansbee
*Assistant Examiner*—Glenford Madamba
(74) *Attorney, Agent, or Firm*—Osha • Liang LLP

(57) ABSTRACT

A system for managing system devices including a first managed system, which includes hardware, an operating system executing on the hardware, and an agent management object (AMO) executing on the operating system and configured to obtain first management information about the operating system and the hardware. The system also includes a second managed system, including a first proxy management object (PMO) configured to receive the first management information from the AMO, request second management information about the hardware from the first managed system, receive the second management information from the first managed system, normalize the first management information and the second management information to obtain first normalized management information, and populate a first proxy data model associated with the PMO using the first normalized management information, where the first normalized management information is used to manage the first managed system.

20 Claims, 7 Drawing Sheets

SCALING SYSTEMS MANAGEMENT USING A STATELESS PROXY

BACKGROUND

A datacenter is a facility that physically houses various equipment, such as computers, servers (e.g., web servers, application servers, database servers), switches routers, data storage devices, load balancers, wire cages or closets, vaults, racks, and related equipment for the purpose of storing, managing, processing, and exchanging data and information between nodes. A node is typically either a client or a server within the data center. Datacenters also provide application services and management for various data processing functions.

Datacenters are a unique environment because all the computers and services provided to clients are within a controlled and well-monitored environment. Additionally, datacenters are not static. In other words, datacenters are constantly growing to add additional computers, services, and/or support more users. Therefore, scaling datacenters to increase performance due to the growth of services and users is an ongoing effort.

Due to the dynamic nature of data centers technological solutions have been developed to aid in the management of datacenters. One common approach is to tier management services and locate them in specific locations in the deployment network topology (i.e., a static locations within the datacenter). However, as the network topology within the datacenter changes, for example, the data center is divided into two subnets necessitating the addition of additional routers, the management service must be re-configured and, in some cases, re-deployed, to function in the new topology.

SUMMARY

In general, in one aspect, the invention relates to a system for managing system devices. The system comprises a first managed system, which includes hardware, an operating system executing on the hardware, and an agent management object (AMO) executing on the operating system and configured to obtain first management information about the operating system and the hardware. The system also comprises a second managed system comprising a first proxy management object (PMO) configured to receive the first management information from the AMO, request second management information about the hardware from the first managed system, receive the second management information from the first managed system, normalize the first management information and the second management information to obtain first normalized management information, and populate a first proxy data model associated with the PMO using the first normalized management information, wherein the first normalized management information is used to manage the first managed system.

In general, in one aspect, the invention relates to a method for managing system devices. The method comprising a first proxy management object (PMO), comprising receiving, directly from a target hardware, a first set of data about the target hardware, receiving, from an agent management object (AMO) operatively connected to the target hardware, a second set of data about the target hardware, normalizing the first set of data and the second set of data to obtain normalized data, populating a proxy data model using the normalized data, and managing the target hardware using the proxy data model.

In general, in one aspect, the invention relates to a computer readable medium comprising software code for managing system devices. The software code for managing systems devices comprises software instructions to receive, directly from a target hardware, a first set of data about the target hardware, receive, from an agent management object (AMO) operatively connected to the target hardware, a second set of data about the target hardware, normalize the first set of data and the second set of data to obtain normalized data, populate a proxy data model using the normalized data, and manage the target hardware using the proxy data model.

Other aspects of the invention will be apparent from the following description and the appended claims.

DETAILED DESCRIPTION

Figure 1A:
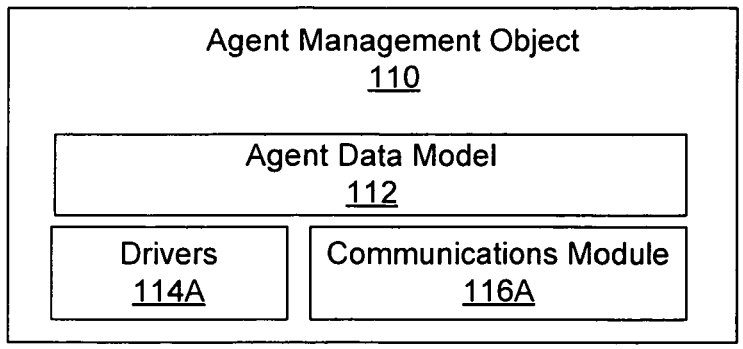
FIGS. 1A-1C show stateless management objects in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for scaling systems management using stateless management objects. More specifically, embodiments of the invention provide stateless management objects which may be deployed in a network topology and used to obtain data about various managed systems (e.g., servers, routers, etc.) in the network topology. The data obtained by the various stateless management objects may be communicated to other management objects within the network topology. The aforementioned data may then be used to provide a complete view of the network topology and to manage the various managed systems in the network topology.

FIG. 1A shows a stateless management object in accordance with one or more embodiments of the invention. More specifically, FIG. 1A shows a agent management object (110), which is one type of stateless management object. The agent management object (110) is an application used to manage systems in a network. The agent management object (110) executes on a managed system (i.e., a device in the network which is associated with an Internet Protocol (IP) address). The agent management object (110) includes drivers (114A) which are used to communicate with systems managed by the agent management object (110). The agent management object (110) also has a communications module (116A) which is used to communicate with other management objects in the network topology. The communications module (116A) is configured to receive data from a proxy management object (120, discussed below in FIG. 1B) and to send data to proxy management objects. Said another way, the agent management object (110) includes a 1:1 relationship with a proxy management object. Further, the communications module (116A) typically does not include functionality for the agent management object to communicate with agent management objects.

In one embodiment of the invention, the agent management object (110) is located in an operating system in a managed system. The agent management object (110) is configured to obtain data about the operating system as well as other components of the managed system on which the operating system executes.

In one embodiment of the invention, the agent management object (110) includes an agent data model (112). The agent data model (112) represents the managed systems as a series of objects. For example, the agent data model (112) may include the following objects: an operating system object representing the operating system executing on the managed system, an application object representing an application executing on the operating system, a hardware component object representing a hardware component of the managed system. Each of the objects in the agent data model (112) includes data about the entity it is representing. This data includes data used by the agent to manage the represented entities. The data is obtained using drivers (114A) and/or other functionality in the agent management object (110) configured to interrogate the operating system.

Figure 1B:
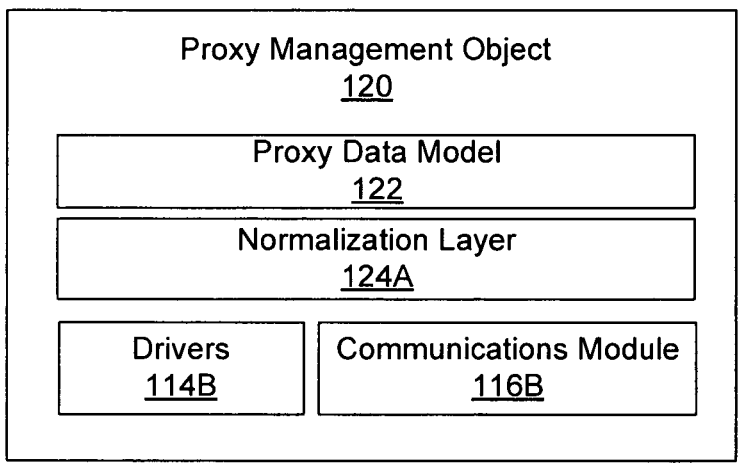

FIG. 1B shows a stateless management object in accordance with one or more embodiments of the invention. More specifically, FIG. 1B shows a proxy management object (120), which is another type of systems management object that executes on a managed system. Similar to the agent management object (110), the proxy management object (120) is an application used to manage systems on a network. The proxy management object may be located on a network device in a datacenter, such as a router.

Some of the components in proxy management object (120) are similar component to the agent management object (110). However, the proxy management object (120) includes additional functionality not present in the agent management object. Specifically, the proxy management object (120) includes drivers (114B) that allow the proxy management object (120) to obtain data about the managed system upon which it is executing and to obtain data about managed systems over a network connection. Further, the proxy management object (120) includes a communications module (116A), which enables the proxy management object (120) to communicate with one or more agent management objects and to communicate with a satellite management object (130). In one embodiment of the invention, there is a many:1 mapping between agent management objects and the proxy management object and a 1:1 relationship with proxy management objects and satellite management objects.

The proxy management object (120) also includes a normalization layer (124A). The normalization layer is configured to receive data from the drivers (114B) and the communications module (116B) and to determine which of the received data to propagate to the proxy data model (122). More specifically, if normalization layer (124A) receives data for a given object (e.g., a hardware component on a managed system) from both the agent management object executing on the managed system as well as a driver (114B) on the proxy management object, the normalization layer includes functionality to determine which of the received data to use. The normalization layer typically uses a normalization model to perform the normalization.

The proxy management object also includes a proxy data model (122). The proxy data model includes objects that represent entities (hardware components, software components, systems, etc.) which are managed, directly and indirectly, by the proxy management object (120). More specifically, the proxy data model (122) may include the following objects: (i) objects present in the agent data models (112) to which the proxy is connected and (ii) objects corresponding to managed system upon which the proxy management object is executing.

Figure 1C:
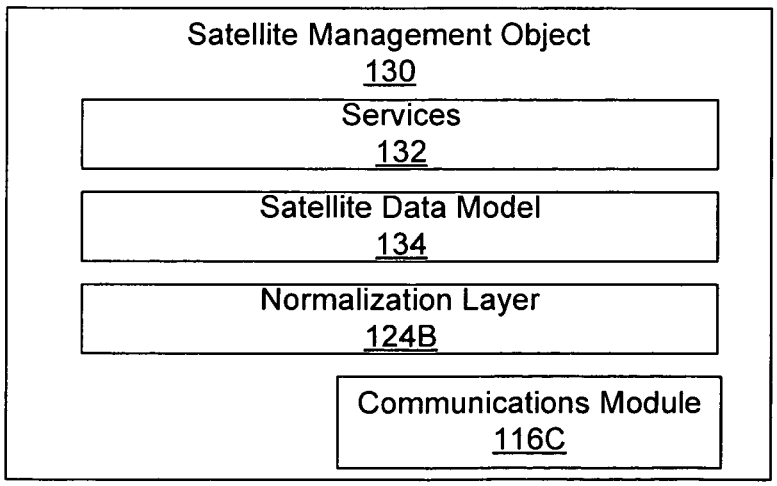

FIG. 1C shows a stateless management object in accordance with one embodiment of the invention. More specifically, FIG. 1C shows a satellite management object (130), which is another type of systems management object that executes on a managed system. The satellite management object (130) includes components similar to the proxy management object and the agent management object; however, the satellite management object includes some additional functionally.

The satellite management object (130) includes a communications module (116C). The communications module (116C) is used to communicate with other systems management objects (e.g., proxy management object, agent management objects) in the network. In addition, the communications module (116C) may also be configured to communicate with a management user interface (not shown). The management user interface allows a user to communicate with the satellite management object. The satellite management object may then communicate requests, updated, etc. received from the management user interface to other managed systems (via the associated proxy management objects and/or agent management objects) in the network using the communications module (116C).

The satellite management object (130) may communicate with the proxy management objects using a publish/subscribe system, such as Secured Socket Layer (SSL)/Atom in combination with traditional communication techniques. Thus, data from the proxy management objects may be sent to the satellite management object (130) (i.e., pushed from the proxy management objects to the satellite management object). This data may include management data, which is data that allows objects in the system to be managed. Further, requests from the satellite management object that are to be communicated to the proxy management objects are placed on appropriate queues within the satellite management object (now shown) to which the proxy objects subscribe. The appropriate management proxies will then be notified and subsequently pull the request from the satellite management object.

The satellite management object (130) also include a normalization layer (124B), which operates in the same manner as the normalization layer (124A) in the proxy management object. Further, similar to the proxy management objects, the satellite management object includes a satellite data model (134). The satellite data model (134) that represent entities (hardware components, software components, systems, etc.) which are managed, directly and indirectly, by satellite management object. Finally, the satellite management object (130) includes services (132). These services (132) allow the satellite management object to discover the managed systems being managed by the satellite management object (130). The result of the discovery services is additional data about the managed systems, which may then be used for further management of the managed systems. The services may facilitate systems management, such as optimizing power utilization, deployment of software upgrades, deployment of new software, modification of configuration files, or optimizing the rate of data transfer across the network. With respect to power utilization, the services (132) may be used to determine (i) resource usage of the various management systems and (ii) application present on the managed systems. The services (132) may then use this information to determine if user executing on a given managed system may be migrated to another managed system. If the migration can occur, then the satellite management object may initiate the migration and then initiate the powering down in the managed systems after the migration is complete.

In one embodiment of the invention, a given network may include multiple satellite management objects, proxy management object, and agent management objects. Further, network may a layer of agent management objects each of which are operatively connected to one or more proxy management objects. The proxy management objects may in turn be operatively connected to other proxy management objects and/or satellite management objects.

In one embodiment of the invention, the satellite management object, and proxy management object, and the agent management object communicate with each other using a publish/subscribe model. For example, an agent management object may subscribe to a proxy management object (or more specifically a queue when the proxy management object). Similarly, a proxy management object may subscribe to a satellite management object (or more specifically a queue when the satellite management object). In each of the aforementioned cases, the lower level systems management object (i.e., the agent management object and the proxy management object, respectively) initiate the connection with the higher level systems management objects (i.e., the proxy management object and the satellite management object, respectively) to determine whether there are jobs (discussed below) to pull from the higher level systems management object.

In one embodiment of the invention, the connections are established at one-minute intervals. More specifically, at one-minute intervals a connection is established between, for example, the agent management object and the proxy management object. Once opened, the connection remains open while the agent management object determines whether there are jobs to retrieve from the proxy management object and the jobs (if any, are retrieved). The connection is then closed. Those skilled in the art will appreciate that connections may be opened at shorter or longer time intervals.

In one embodiment of the invention, when a job is initially placed on a job queue, a determination is made about whether the job is a light weight job (i.e., the job consumes less than a pre-defined amount of resources, e.g., a name change operation). In such cases, the light weight jobs are placed in a separate high priority queue (or in a high priority portion of the job queue). In such cases, the connections are established at three-second intervals by a lower level systems object to determine to presence of any light weight jobs. The connection to determine whether there are any light weight jobs once opened, remains open while the job is obtained, executed, and a response is provided the lower level systems object to the higher level systems object. The connection is then closed. Those skilled in the art will appreciate that connections may be opened at shorter or longer time intervals.

Thus, a given systems management object may communicate with another systems management object using two different connection mechanisms: (i) connections for non-light weight jobs and (ii) connections for light weight jobs. The definition of a light weight job may defined on a per-implementation basis.

In one embodiment of the invention, non-light weight jobs are ordered within the job queue based on, for example, priority of the job, type of job, amount of time the job has been in the queue. Further, the systems management objects remove jobs from the front of the job queue for processing.

Figure 2:
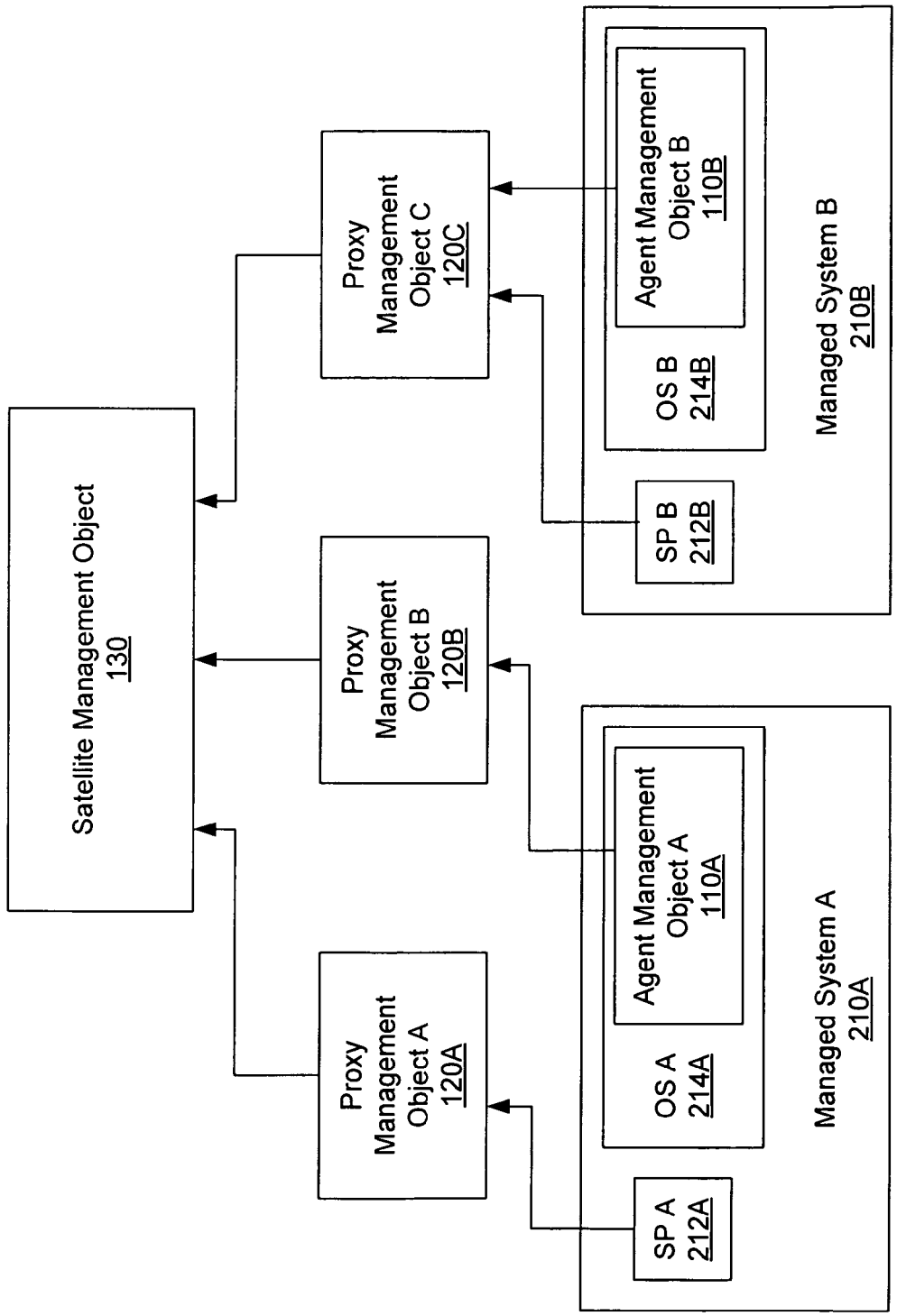
FIG. 2 an example in accordance with one or more embodiments of the invention.

FIG. 2 shows an example in accordance with one or more embodiments of the invention. The example is not intended to limit the scope of the invention. Turning to the example, the system includes a satellite management object (130) operatively connected to three proxy management objects (120A, 120B, 120C). Further, proxy management object B (120B) is operatively connected to agent management object A (110A) and proxy management object C (120C) is operatively connected to agent management object B (110B). Agent management object A (110A) is executing on managed system A (210A) and agent management object B (110B) is executing on managed system B (210B). Each of the managed systems (210A, 210B) include a service processor (212A, 212B) and an operating system (214A, 214B).

As shown in FIG. 2, proxy management object A (120A) configured to obtain information directly (i.e., without the involvement of agent management object A (110A)) from service processor (SP) A (212A). Further, proxy management object A (120A) configured to obtain information directly (i.e., without the involvement of agent management object A (110A)) manage SP A (212A).

Proxy management object B (120B) is configured to obtain data from agent management object A (110A). More specifically, proxy management object B (120B) obtains data from an agent data model (not shown) populated and maintained by agent management object A (110A). Further, proxy management object B (120B) is configured to directly manage agent management object A (110A). By managing agent management object A (110A), proxy management object B (120B) may indirectly manage operating system A (214A) as well as hardware components (which may include SP A (212A)) managed by operating system A (214A). Finally, proxy management object C (120C) is configured to obtain data directly from managed system B (210B) as well as indirectly via agent management object B (110B).

Though not shown in FIG. 2, the proxy data models populated and maintained by the proxy management objects (120A, 120B, 120C) are communicated to the satellite management object (130) and used to populate a satellite data model (not shown). In populating the satellite data model, the satellite management object (130) may implement a normalization layer (not shown). For example, both proxy management object A (120A) and proxy management object B (120B) may include an object in their respective proxy object models which represents SP A (212A). In this scenario, the satellite management object (130) may use a normalization policy to determine which data (i.e., data from proxy management object A (120A) and proxy management object B (120B)) to use to populate the object representing SP A (212A) in the satellite management object.

Figure 3:
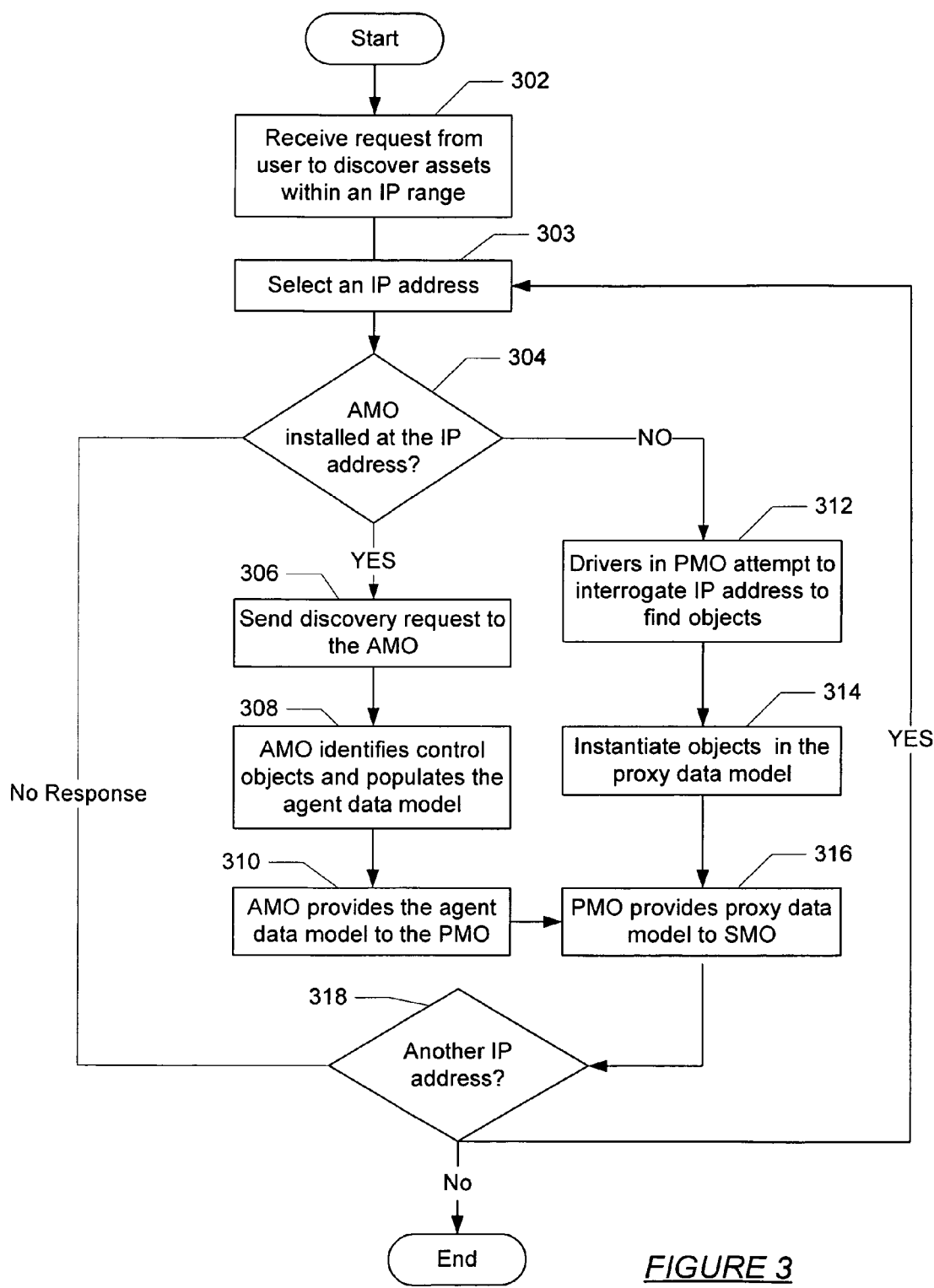
FIG. 3 shows a flowchart in accordance with one or more embodiments of the invention.

FIG. 3 shows a flowchart in accordance with one or more embodiments of the invention. More specifically, FIG. 3 shows a flowchart of a method for discovering assets in a network in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

At 302, a request is received from a user to discover assets within a range of IP addresses. According to one or more embodiments of the invention, the satellite management object (SMO) receives the request and the range of IP addresses via a management user interface. Alternatively, discovery may be trigger automatically by the SMO. At 303, a first IP address in the range on IP addresses is selected. At 304, a determination is made about whether an agent management object (AMO) is installed on the system identified with the IP address. The determination in 304 may be performed by reviewing the satellite data model, by reviewing the appropriate proxy data model, and/or by sending (using TCP/IP) a request to the system and awaiting a response from the system.

If an AMO is present on the system at the IP address, then the method proceeds to 306. At 306, a discovery request is sent to the AMO. As described above, the systems management objects communicate with each other using a publish and subscribe system, such as SSL/ATOM. Accordingly, a request is added to the queue corresponding to the AMO, where the queue is located in a proxy management object (PMO) and/or a SMO.

In one embodiment of the invention, the request is initially placed on a queue corresponding to a PMO. After the PMO retrieves the request, the PMO may place the request on the queue corresponding to the AMO. As discussed above, the AMO subsequently retrieves and processes the request.

Returning to FIG. 3, at 308, the AMO identifies objects that it manages and populates the agent data model appropriately. According to or more embodiments of the invention, the AMO may identify objects it manages by instantiating one or more drivers and then using the drivers to obtain information about the managed system upon which it is executing. The AMO may also include functionality to query the operating system upon which it is executing for information (e.g., configuration information, version numbers, serial numbers, build number, software vendor, manufacturer, OEM information, power management capabilities, etc.) about software components (e.g., applications, operating systems, virtualization software, etc.) and hardware components (e.g., processors, memory, persistent storage, peripherals, network interface cards, etc.) Using the aforementioned information, the AMO subsequently populates the agent data model.

At 310, the AMO provides the agent data model to the PMO (to which it is operatively connected). According to one or more embodiments of the invention, this may be done using the communications modules located in the AMO and the PMO. At 316, the PMO provides an updated proxy data model to the SMO. Those skilled in the art will appreciate that only the updates may be communicated to the SMO and/or the PMO may only send updates to the SMO after a minimum number of updates have been received by the PMO. At 318, a determination is made about whether there is another IP address within the IP range to query. If additional IP addresses exist, the method proceeds to 303. Alternatively, the method ends.

Returning to 304, if no AMO is installed on the system at the IP address then the process proceeds to 312. At 312, drivers in the PMO interrogate the system at the IP address. More specifically, the PMO executing on a remote system (e.g., a system connected over a network connection to the system at the IP address) locates hardware and/or software components in the system at the IP address which may be represented as objects in the proxy data model.

At 314, the identified objects are instantiated into the proxy data model. At 316, the PMO provides the proxy data model (as discussed above) to the SMO. According to one or more embodiments of the invention, by sending data models from the AMO to the PMO, and further to the SMO, the entire system becomes fully inspectable by the systems management objects. The method then proceeds to 318. Returning to 304, if system at the IP address does not respond (i.e., the PMO or SMO) cannot ascertain whether that the system at the IP address does or does not have an AMO, then the process proceeds to 318. The aforementioned steps are repeated until all IP addresses in the range of IP addresses are interrogated.

Figure 4:
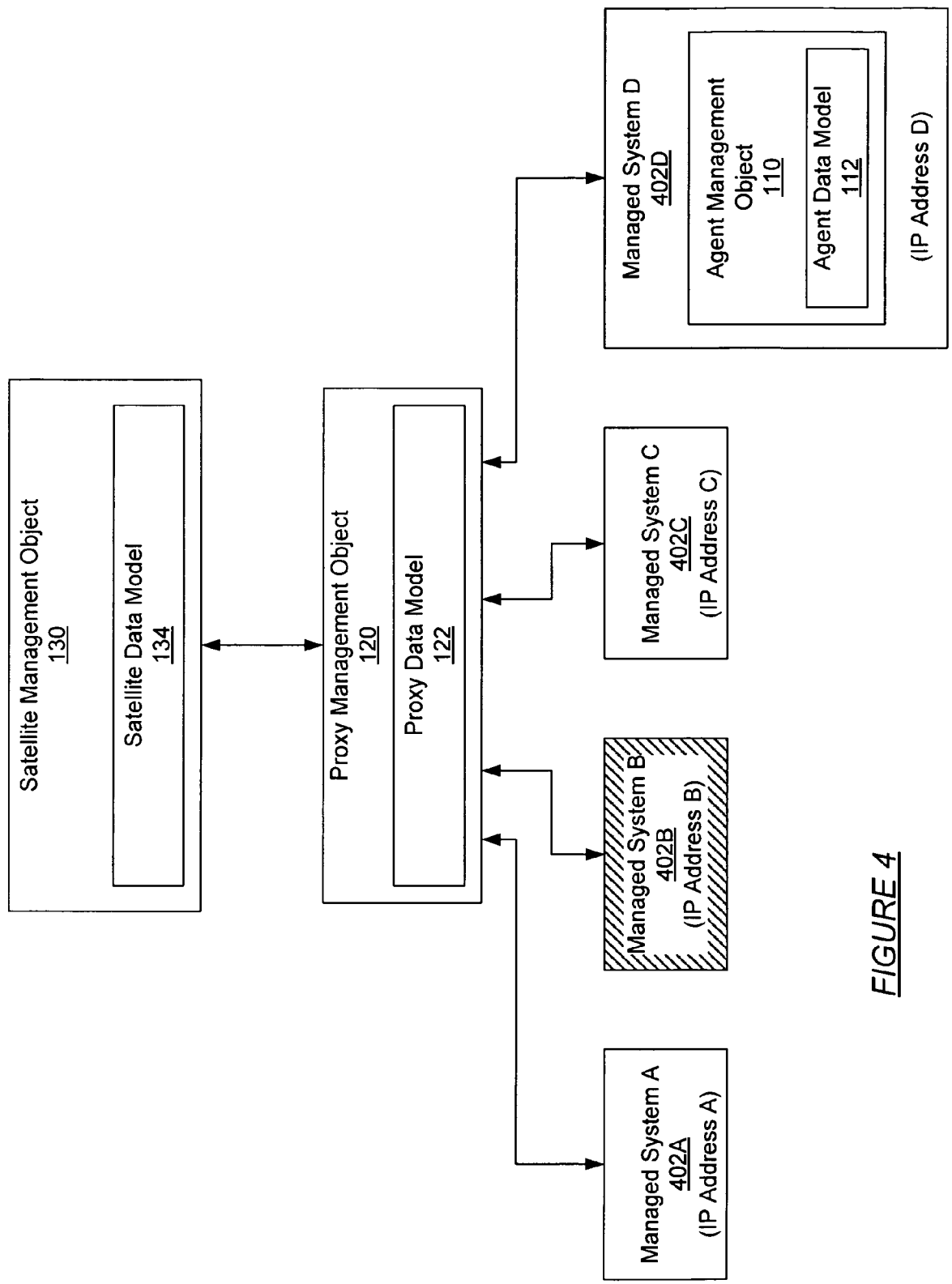
FIG. 4 shows a system in accordance with one or more embodiments of the invention.

FIG. 4 shows an example in accordance with one or more embodiments of the invention. More specifically, FIG. 4 shows an example of using the method shown in FIG. 3. The following example is not intended to limit the scope of the claims.

Turning to the example, a request for discovery is initially received by the satellite management object. It is important to note that discovery may occur at any level, but for purposes of this example the request is sent to the satellite management object (130). The request includes the following IP address range: IP address A-IP address E. Those skilled in the art will appreciate that the IP address range may be specified in any manner without departing from the invention. Upon receipt of the request, the satellite management object (130) determines that the proxy management object (PMO) (120) is the only (PMO) within the IP address range. Accordingly, the SMO (130) queries the PMO (120) to obtain its proxy data model. At this stage, the PMO (120) may already have an up-to-date proxy data model and, accordingly, once the SMO (130) receives the proxy data model, the discovery of managed systems in the IP address range is complete.

However, if the PMO (120) does not include an up-to-date proxy data model, the PMO attempts to interrogate IP addresses in the range to find managed systems. Specifically, the PMO (120) sends requests to IP addresses A-E, and receives back responses from managed systems A, C, and D. Managed system B, while in the IP address range is currently powered down and, accordingly, does not respond to the request. Further, the PMO (120) determines that managed system D (402D) includes an agent management object (AMO) (110).

Based on the above responses, the PMO (120) obtains queries managed systems A and C (402A, 402C) to determine hardware and/or software components to represent as objects in the proxy data model (122). Further, the PMO (120) obtains the agent data model (112) from the AMO (110) executing on managed system D (402D).

After the proxy data model (122) has been populated with objects representing hardware and/or software components in managed system A (402A), managed system B (402B), and managed system D (402D), the PMO (120) communicates the proxy data model (122) to the SMO (130). Those skilled in the art will appreciate that some networks may include multiple levels of PMOs. In such cases, the PMO (120) might communicate the proxy data model (122) to one or more other PMOs (not shown) before the proxy data model (which may also include objects from the intervening PMOs) is communicated to the SMO (130).

Figure 5:
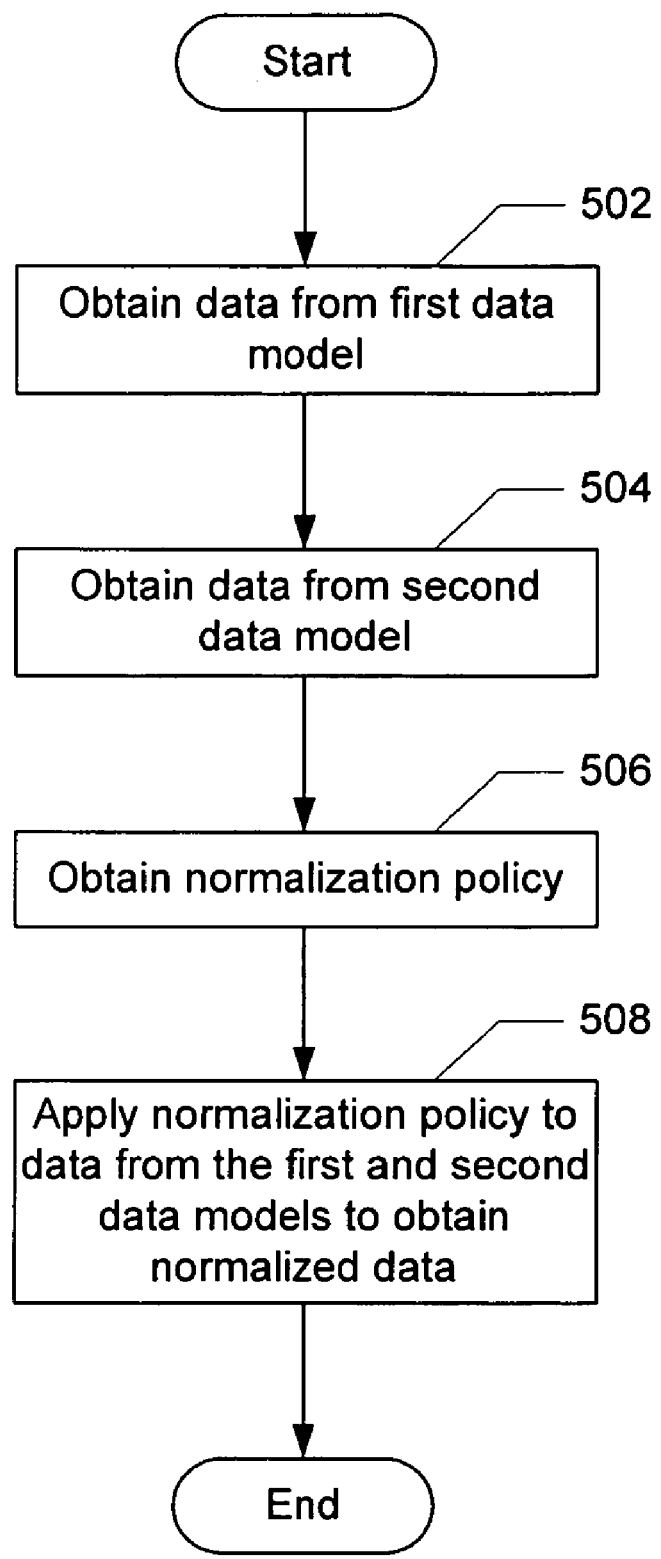
FIG. 5 shows a flowchart in accordance with one or more embodiments of the invention.

FIG. 5 shows a flowchart in accordance with one or more embodiments of the invention. Specifically, FIG. 5 shows a flowchart of a method for normalizing in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel.

At 502, a first data model is received from a systems management object. According to one or more embodiments of the invention, the systems management object may be an agent management object or a proxy management object, and may be received a proxy management object or a satellite management object. Similarly, at 504, a second data model is received from another systems management object.

At 506, a normalization policy is obtained. According to one or more embodiments of the invention, this policy may be stored in the proxy management object or the satellite management object. The normalization policy may change depending on the needs of the user. For example, if the user is managing the system for power management, this will affect the method of managing that object and the normalization policy will be configured to normalize the data accordingly. In particular, the normalization policy will favor sources of data which are more accurate with respect to resource usage and/or power consumption. Said another way, if two sources provide data about the same hardware component but one source is considered to provide more accurate information with respect to resource usage and/or power consumption, then this source is favored over the other source.

At 508, the normalization layer applies the normalization policy to data from the first and second data models to obtain normalized data. The normalized data is then used to populate the appropriate proxy data model or satellite data model.

Figure 6:
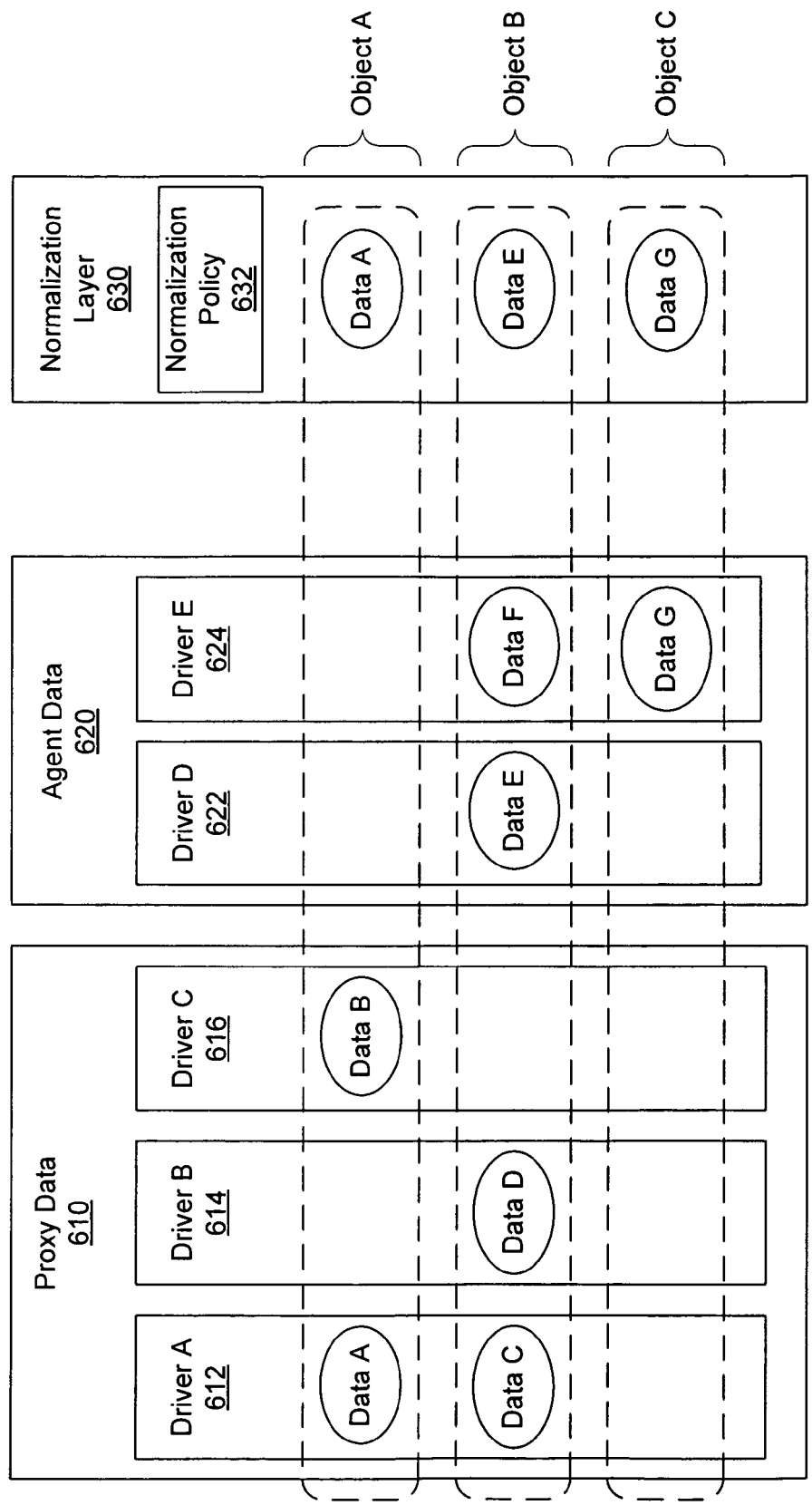
FIG. 6 shows a system in accordance with one or more embodiments of the invention.

FIG. 6 shows an example in accordance with one or more embodiments of the invention. The example is not intended to limit the scope of the invention. In the example shown, the normalization layer (630) receives data from a proxy management object (610) and from an agent management object (620).

The data received from the proxy management object (610) includes information from Driver A (612), Driver B (614), and Driver C (616). Driver A provides Data A about Object A and Data C about Object C. Driver B also is able to obtain data (Data B) about object B. Finally, Drive C is able to obtain data (Date B) about object A.

The normalization layer (630) also receives data from an agent management object (620). The data from the agent management object includes information obtained from Driver D (622) and Driver E (624). Driver D provides Data E about object B, and Driver E provides Data F about object B and Data G about object C.

After receiving the proxy data (610) and the agent data (620), the normalization layer normalizes the data. As shown, the normalization layer determines which of the sources to use to populate each object. As shown in FIG. 6, Data A and Data B are shown to correspond to the same object. Similarly, Data C, Data D, Data E, and Data F are shown to correspond to a second common object. Finally, Data G is shown to be the only data received that corresponds to a third object.

The normalization layer (630) uses a normalization policy (632) to determine how data is normalized. For example, if a user is managing a system for power management purposes, it may be beneficial to manage the first object using Data A rather than Data B. Accordingly, Data A is chosen. Similarly, Data E is chosen for the second object. Finally, Data G is the only data received by the normalization layer for the third object and, accordingly, Data G is used to populate object C. According to one or more embodiments of the invention, the normalized data may now be used to create a data model for the systems management object that includes the normalization layer (630).

The following is another example of how the normalization layer may be used to normalize data from multiple sources. Turning to the example, consider a scenario in which a managed system includes a Lights Out Management (LOM) module. The LOM module may be discovered by a proxy management object using direct network access. In addition, the LOM module may be discovered using an agent management object executing on the operating system within the managed system using system calls. The normalization layer located in the proxy management object may obtain data about the LOM module from both the proxy management object and the agent management object. Upon receipt of this data, the normalization layer using a normalization policy determines from which data (i.e., data from the proxy management object and data from the agent management object) to use in the proxy data model.

In one embodiment of the invention, the service management objects may be placed on systems within the network at any point in time. Once a service management object is placed on a system in the network, the service management object attempts to locate other service management objects. For example, if an agent management object is placed in the network, the agent management object may attempt to locate proxy management objects and/or satellite management objects with which to communicate.

The agent management object, upon locating other system management objects, may query the system management object to determine whether the system management object includes any objects in its data model which describes the system upon which the agent management object is executing. Using this information along with information obtained from the system directly, the agent management object may then generate an agent data model. The agent data model may be subsequently used to update the data models on other system management objects.

Further, if a proxy management object is deployed on a system in the network, the proxy management object may attempt to locate both agent management objects and satellite management objects. The proxy management object may subsequently use the located satellite management objects and agent management objects to populate the proxy data model. The proxy management object may concurrently attempt to populate its own proxy data model using its own drivers.

Using the above functionality, systems management objects may be deployed through out the life cycle of the data center and, in the event a proxy management object is removed or fails, the remaining systems management objects may reconfigure their communications paths using, for example, the discovery mechanism shown in FIG. 3. Further, regardless of which system management objects are present in the network at any given time, the normalization layer may be used to provide a consistent view of the objects being managed within the network.

In one embodiment of the invention, the asynchronous communication protocols (e.g., SSL/ATOM) allow the systems management objects to communicate in network without monopolizing bandwidth within the network.

Those skilled in the art will appreciate that while embodiments of the invention have been described with respect to a data center, the invention may be implemented on any network topology.

Figure 7:
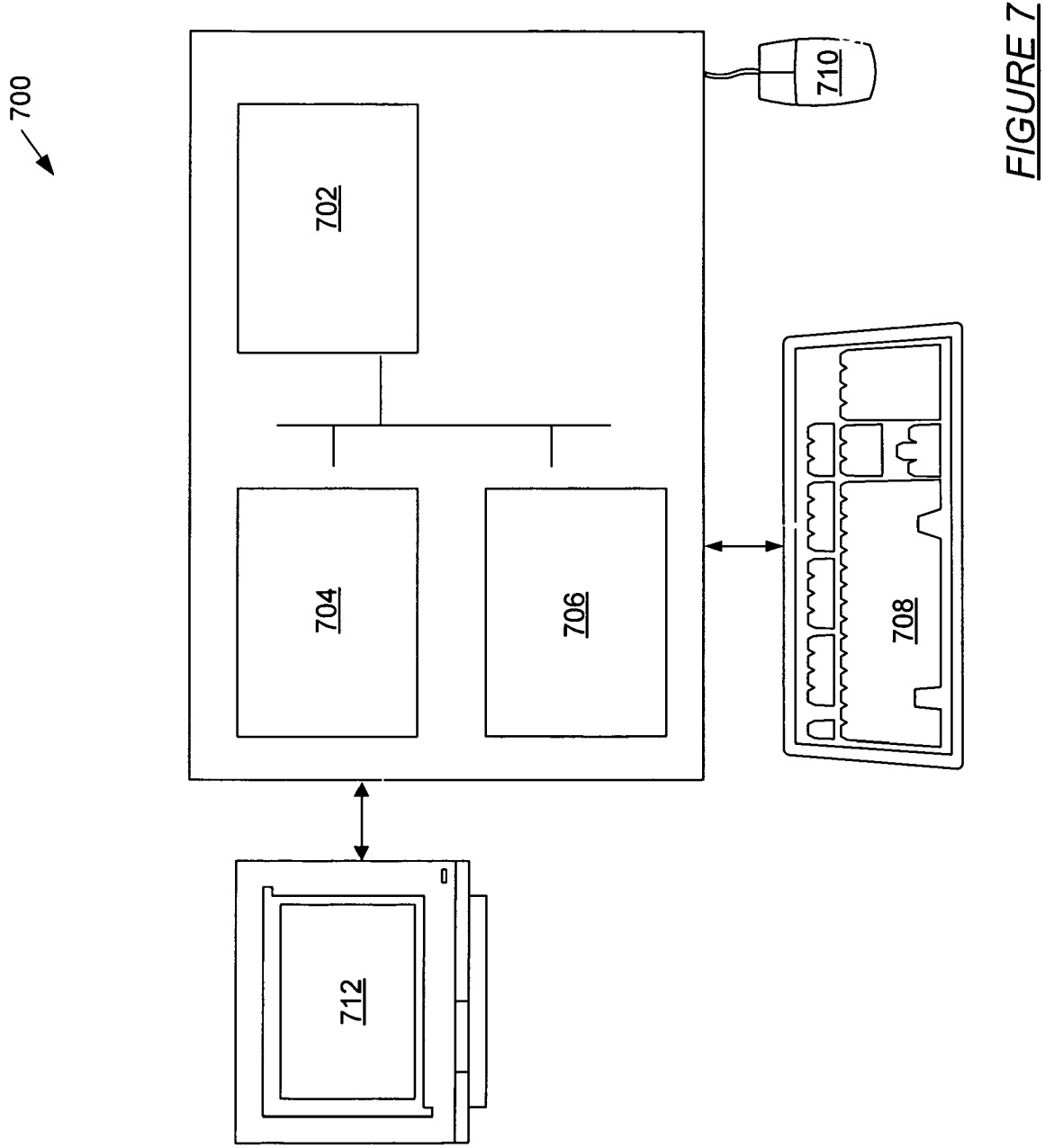
FIG. 7 shows a computer system in accordance with one or more embodiments of the invention.

FIG. 7 represents a computer system. Embodiments of the invention may be implemented on virtually any type of computer regardless of the platform being used. For example, as shown in FIG. 7, a computer system (700) includes one or more processor(s) (702), associated memory (704) (e.g., random access memory (RAM), cache memory, flash memory, etc.), a storage device (706) (e.g., a hard disk, an optical drive such as a compact disk drive or digital video disk (DVD) drive, a flash memory stick, etc.), and numerous other elements and functionalities typical of today's computer). The computer (700) may also include input means, such as a keyboard (708), a mouse (710), or a microphone (not shown). Further, the computer (700) may include output means, such as a monitor (712) (e.g., a liquid crystal display (LCD), a plasma display, or cathode ray tube (CRT) monitor). The computer system (700) may be connected to a network (not shown) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (700) includes at least the minimal processing, input, and/or output means necessary to practice embodiments of the invention.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system for managing system devices, comprising:
    a first managed system, comprising:
        hardware,
        an operating system executing on the hardware, and
        an agent management object (AMO) executing on the operating system and configured to obtain first management information about the operating system and the hardware; and
    a second managed system comprising a first proxy management object (PMO) configured to:
        receive the first management information from the AMO,
        send a request for second management information about the hardware from the hardware, wherein the request is configured to bypass the AMO,
        receive, in response to the request, the second management information from the hardware,
        normalize the first management information and the second management information to obtain first normalized management information, and
        populate a first proxy data model associated with the PMO using the first normalized management information, wherein the first normalized management information is used to manage the first managed system.

2. The system of claim 1, further comprising:
    a satellite management object (SMO) operatively connected to the first PMO and a second PMO, wherein the SMO is configured to:
        receive the first proxy data model from the first PMO,
        receive a second proxy data model from the second PMO,
        normalize the first proxy data model and the second proxy data model to obtain second normalized management information, and
        populate a satellite data model associated with the SMO using the second normalized management information, wherein the second normalized management information is used to manage the first PMO, the second PMO, and the AMO.

3. The system of claim 1, wherein the AMO comprises a driver and wherein the AMO is configured to use the driver to obtain management information associated with hardware, and wherein the first management information comprises the management information associated with the hardware.

4. The system of claim 1, wherein the AMO comprises an agent data model, wherein the agent data model includes a management object for each of the entities managed by the AMO, wherein each of the entities is one selected from a group consisting of a hardware component of the hardware, the operating system, and an application executing on the operating system.

5. The system of claim 4, wherein the first proxy data model includes a management object for each of the entities managed by the PMO, wherein each of the entities is one selected from a group consisting of a hardware component of hardware on which the PMO is executing, a hardware component of the hardware, the operating system, and the application executing on the operating system.

6. The system of claim 4, wherein the AMO communicates updates in the agent data model to the PMO.

7. A method for managing system devices, comprising a first proxy management object (PMO), comprising:
    receiving, directly from a target hardware, a first set of data about the target hardware;
    receiving, from an agent management object (AMO) operatively connected to the target hardware, a second set of data about the target hardware, wherein the AMO is bypassed when receiving the first set of data;
    normalizing the first set of data and the second set of data to obtain normalized data;
    populating a proxy data model using the normalized data; and
    managing the target hardware using the proxy data model.

8. The method of claim 7, further comprising:
    sending the proxy data model to a satellite management object (SMO), wherein the SMO is operatively connected to a proxy management object (PMO) and wherein the SMO is configured to:
        populate a satellite data model using the proxy data model; and
        manage the target hardware using the satellite data model.

9. The method of claim 7, wherein the second set of data about the target hardware is received from an agent data model.

10. The method of claim 7, wherein normalizing the first set of data and the second set of data comprises using a normalizing policy.

11. The method of claim 10, wherein the normalization policy specifies which of the first data set and the second data set to use when the first data set and the second data set include management information about the target hardware.

12. The method of claim 8, wherein the PMO is removed and a second PMO is instantiated, wherein a second proxy data model in the second PMO is populated from data received from the SMO and requested from the AMO.

13. The method of claim 8, wherein the PMO receives an management update from the AMO and sends the management update to the SMO.

14. A non-transitory computer readable medium comprising software code for managing system devices, comprising software instructions to:
　receive, directly from a target hardware, a first set of data about the target hardware;
　receive, from an agent management object (AMO) operatively connected to the target hardware, a second set of data about the target hardware, wherein the AMO is bypassed when receiving the first set of data;
　normalize the first set of data and the second set of data to obtain normalized data;
　populate a proxy data model using the normalized data; and
　manage the target hardware using the proxy data model.

15. The computer readable medium of claim 14, further comprising software instructions to:
　send the proxy data model to a satellite management object (SMO), wherein the SMO is operatively connected to a proxy management object (PMO) and wherein the SMO is configured to:
　　populate a satellite data model using the proxy data model; and
　　manage the target hardware using the satellite data model.

16. The non-transitory computer readable medium of claim 14, wherein the second set of data about the target hardware is received from an agent data model.

17. The non-transitory computer readable medium of claim 14, wherein normalizing the first set of data and the second set of data comprises using a normalizing policy.

18. The non-transitory computer readable medium of claim 14, wherein the normalization policy specifies which of the first data set and the second data set to use when the first data set and the second data set include management information about the target hardware.

19. The non-transitory computer readable medium of claim 15, wherein the PMO is removed and a second PMO is instantiated, wherein a second proxy data model in the second PMO is populated from data received from the SMO and requested from the AMO.

20. The non-transitory computer readable medium of claim 15, wherein the PMO receives an management update from the AMO and sends the management update to the SMO.

* * * * *

UNITED STATES PATENT AND TRADEMARK OFFICE
CERTIFICATE OF CORRECTION

PATENT NO. : 7,899,898 B2
APPLICATION NO. : 12/165227
DATED : March 1, 2011
INVENTOR(S) : Michael J. Wookey It is certified that error appears in the above-identified patent and that said Letters Patent is hereby corrected as shown below:

In Claim 15, column 13, line 28 it reads "The computer readable medium" and should read --The non-transitory computer readable medium--.

Signed and Sealed this
Thirty-first Day of May, 2011

David J. Kappos
*Director of the United States Patent and Trademark Office*